United States Patent [19]
Castillo

[11] Patent Number: 5,858,206
[45] Date of Patent: Jan. 12, 1999

[54] PROCESS FOR IMPROVED WATER WASH IN FCC GAS CONCENTRATION UNITS

[75] Inventor: Ricardo Castillo, Arlington Heights, Ill.

[73] Assignee: UOP LLC, Des Plaines, Ill.

[21] Appl. No.: 859,298

[22] Filed: May 20, 1997

[51] Int. Cl.$^6$ .................................................. C10G 11/00

[52] U.S. Cl. ........................... 208/101; 208/95; 208/113; 208/47; 208/48 R

[58] Field of Search ..................................... 208/47, 48 R, 208/95, 101, 113

[56] References Cited

U.S. PATENT DOCUMENTS

| | | | |
|---|---|---|---|
| 3,470,084 | 9/1969 | Scott | 208/101 |
| 5,458,849 | 10/1995 | Majestic et al. | 208/47 |

OTHER PUBLICATIONS

"Handbook of Petroleum Refining Process," 2$^{nd}$ Edition, edited by Robert A. Meyers, published by McGraw Hill, NY, 1997, pp. 3.55–3.78. (no month).

"1994 National Petroleum Refiners Association (NPRA) Q & A Session on Refining and Petrochemical Technology," pp. 78–80, published by NPRA, 1994. (no month).

*Primary Examiner*—Walter D. Griffin
*Attorney, Agent, or Firm*—Thomas K. McBride; John G. Tolomei; Richard P. Silverman

[57] ABSTRACT

Wash water is used to remove impurities such as hydrogen sulfide, ammonia, and hydrogen cyanide from light hydrocarbons and gases derived from refinery fluid catalytic cracking operations. The present invention is a process of low pressure recirculation of wash water combined with low pressure removal of waste water which results in the efficient removal of the above impurities at significantly reduced wash water rates.

7 Claims, 2 Drawing Sheets

PROCESS FOR IMPROVED WATER WASH IN FCC GAS CONCENTRATION UNITS

FIELD OF THE INVENTION

This invention relates to a method of removing impurities from a fluid catalytic cracking (FCC) effluent by reducing the amount of fresh wash water in the FCC gas concentration unit.

BACKGROUND OF THE INVENTION

A fluid catalytic cracking (FCC) is a process for the conversion of straight-run atmospheric gas oil, vacuum gas oil, certain atmospheric residues, and heavy stocks recovered from other operations into high octane gasoline, light fuel oils, and olefin-rich light gases. In simplified terms, the cracking reactions are carried out in a vertical reactor vessel in which vaporized oil rises and carries along with it, in intimate contact, small fluidized catalyst particles. The reactions are very rapid, and only a few seconds of contact time are necessary for most applications. In a petroleum refinery, the FCC unit typically processes 30–50% of the crude oil charged to the refinery and produces gasoline blending components which may account for 50 to 20% of the total motor gasoline produced in the refinery.

Every FCC unit comprises a reactor and regenerator where the feedstock is cracked into a reactor effluent containing hydrocarbons. The hydrocarbons range in composition from the lightest methane to the heaviest, highest boiling hydrocarbon component in the feedstock. The reactor effluent also includes hydrogen and impurities such as hydrogen sulfide, hydrogen cyanide, and nitrogen compounds. The reactor effluent is passed to a main fractionator which separates the reactor effluent into wide boiling ranges such as an overhead stream which includes gasoline and lighter components and liquid products such as heavy naphtha, cycle oils, and slurry. The overhead stream is passed to a gas concentration unit or to an unsaturates gas plant wherein the unstable gasoline components and lighter components are separated into a fuel gas stream, a $C_3$–$C_5$ olefinic hydrocarbon stream, and a stabilized, motor fuel, or gasoline blending component. Chapter 3.3 of the "Handbook of Petroleum Refining Processes, $2^{nd}$ Edition, edited by Robert A. Meyers, and published by McGraw Hill, N.Y., in 1997, which is hereby incorporated by reference, describes the FCC unit and the gas concentration section. The operation of a gas concentration section for the recovery of gaseous hydrocarbons from gasoline disclosed in U.S. Pat. No. 3,470,084 to Scott is hereby incorporated by reference.

Early FCC units were designed to operate on vacuum gas oils directly fractionated from crude oils. Typically, these vacuum oils came from high quality crude oils. Today, much of the high quality feedstock for FCC units has been depleted and modern FCC units process less favorable materials. These less favorable materials include a substantial amount of sulfur compounds, metal cations, and nitrogen compounds such as ammonia and nitrites. As a result, the contaminant levels in the FCC effluent have been growing, particularly in the $C_3$–$C_5$ effluent fraction. Without appropriate treatment, the contaminants in the $C_3$–$C_5$ FCC effluent fraction can be transmitted to sensitive downstream processes where they reduce the effectiveness of downstream catalysts and create unfavorable by-product reactions in processes such as etherification. The most important function of a water wash system in the FCC gas plant or gas concentration section is to remove solids and thereby prevent the build-up of solids in the fractionation, cooling, and rotating equipment. Solids and their deposit in the equipment lead to corrosion under these deposits. The presence of the ammonia, the hydrogen sulfide, and hydrogen cyanide can lead to the formation of ammonium bisulfide and cyanide. When the concentration of cyanides is high, corrosion and hydrogen blistering may potentially occur in the gas concentration section. Some of these problems can be avoided by keeping the impurities in dilute concentrations or by purging the maximum amount of these impurities as well as any ammonium bisulfide and cyanide from the system in the water withdrawn from the gas concentration unit. However, it is also highly desirable from an environmental aspect to minimize the amount of wash water employed to purge these impurities.

One type of water wash scheme which is most favored in the industry and widely practiced commercially is known as the concurrent water circulation process. In the concurrent water wash scheme, the wash water is circulated in the direction of increasing pressure and a waste water stream is withdrawn at the highest pressure. For example, in the concurrent water wash scheme, the wash water is admixed with the overhead stream from the FCC main column at the lowest pressure in the gas concentration unit. The overhead stream is cooled and condensed to provide a low pressure water stream and a low pressure vapor stream. The low pressure vapor stream is compressed to an intermediate pressure, washed with the low pressure water stream, cooled, and flashed to provide an intermediate vapor stream and an intermediate liquid stream. The intermediate liquid stream is compressed to a high pressure, admixed with the intermediate liquid stream, cooled, and condensed to provide a high pressure liquid stream, a high pressure vapor stream and a high pressure water stream. A portion of a high pressure water stream is withdrawn as a sour water waste stream comprising ammonium bisulfides and impurities, and a portion of the high pressure water stream is recycled to be admixed with the overhead stream. This wash water cascade scheme is referred to as "Option b" in response to "Question 26" of the "1994 National Petroleum Refiners Association (NPRA) Q & A Session on Refining and Petrochemical Technology," pages 78–80, 1994, published by the NPRA, and hereby incorporated by reference. Wash water rates for this scheme range from about 1 to 25 gallons per minutes per thousand barrels of total feed to the FCC reactor.

Other wash water cascade schemes, referred to as "Option a" and "Option c" in the above mentioned NPRA reference, introduce the fresh wash water at intermediate pressure and high pressure and remove the sour water waste stream at low pressure. At high pressure, the wash water is in equilibrium with the hydrocarbons and when the sour water stream is withdrawn at high pressure as in option b, there is a small amount of hydrocarbon gas dissolved in the high pressure sour water stream. To avoid sending this gas to downstream treatment facilities which can not tolerate the presence of the hydrocarbon gas, the high pressure sour water stream is returned to main column overhead stream where the hydrocarbon gas can be flashed off at low pressure and the sour water stream is withdrawn at low pressure. However, the impurities in the water withdrawn at the high pressure are thereby reintroduced to the low pressure overhead stream. These schemes result in returning to the main column overhead stream the ammonia, $H_2S$, and HCN which were concentrated at the high pressure. Because hydrocarbon gases dissolved in the high pressure water stream can build up and be carried out with the sour water stream in "Option b" schemes, "Option a" schemes are favored to avoid producing a hydrocarbon gas stream in the downstream sour water treatment facilities. However, the wash water rates for the Option a and c schemes are about the same as those of the "Option b" scheme.

Water cascade schemes for FCC gas concentration units are sought which permit the operation of the gas concentration at lower water rates which produce less waste water while controlling the build-up of impurities in the gas concentration unit.

SUMMARY OF THE INVENTION

In one embodiment, the invention is a process for water washing an overhead stream withdrawn from an FCC main fractionator of an FCC unit processing an FCC feedstock to remove impurities from the overhead stream. The process comprises a series of steps. The overhead stream is admixed with a first portion of a first water recycle stream at a low pressure to provide a combined overhead stream. The combined overhead stream is cooled and at least partially condensed to provide a cooled overhead stream and the cooled overhead stream is passed to a low pressure separator to provide a low pressure vapor stream, a low pressure liquid stream, and a low pressure aqueous stream. The low pressure vapor stream is raised to an intermediate pressure to provide an intermediate vapor stream, and the intermediate vapor stream is admixed with a wash water stream and a second portion of the first water recycle stream to provide an intermediate pressure admixture. The intermediate pressure admixture is raised to a high pressure to provide a high pressure stream and the high pressure stream is cooled and at least partially condensed to provide a cooled high pressure stream. The cooled high pressure stream is passed to a high pressure separator to provide a high pressure vapor stream, a high pressure liquid, and a high pressure aqueous stream. At least a portion of the high pressure aqueous stream is recycled as the first water recycle stream. A portion of the low pressure aqueous stream is withdrawn as a sour water stream. By returning a portion of the high pressure aqueous stream admixed with fresh water to water wash the intermediate pressure vapor stream according to the present invention, it was possible to cut the amount of fresh in half while removing the same amount of impurities.

DETAILED DESCRIPTION OF THE INVENTION

Figure 1:
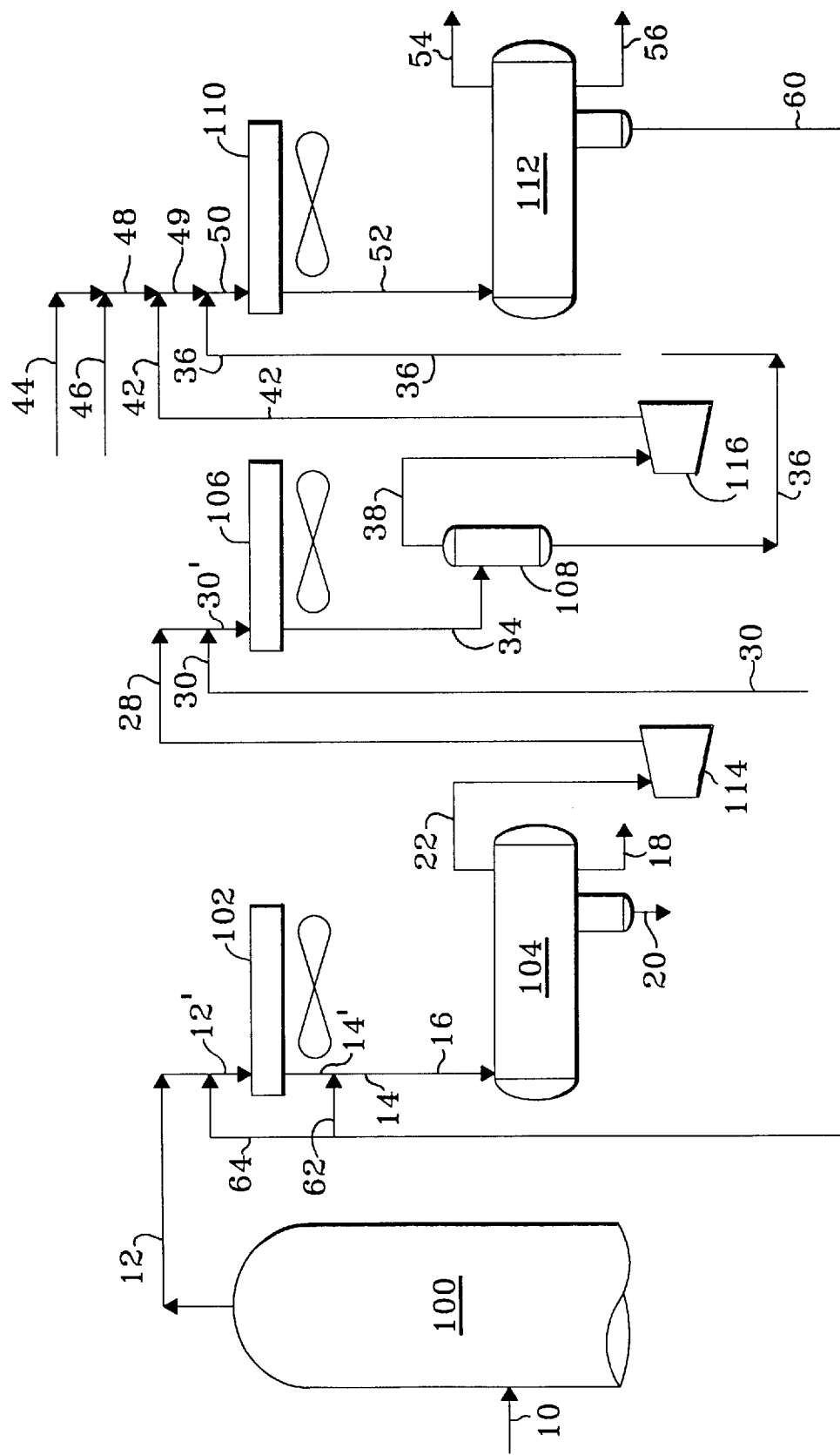
FIG. 1 is a simplified process flow diagram illustrating a conventional water wash scheme.

Any FCC process known to those skilled in the art is suitable for use in the present invention. In a preferred embodiment, the reactor section of the FCC unit includes the features of dilute phase cracking in the riser and quick-quench cracking. Additional information regarding FCC unit process conditions and features suitable for use in the present invention can be found in Meyers, Robert A., *Handbook of Petroleum Refining Processes*, McGraw Hill, Inc., Chapter 3.3, 1997. Suitable FCC feedstocks include, but are not limited to, straight-run atmospheric gas oils, vacuum gas oils, and certain atmospheric residues. The FCC catalyst can be any FCC catalyst known to those skilled in the art; preferably, it will be a zeolite-containing catalyst. In the FCC reaction section of the FCC unit, the FCC feedstock is catalytically converted to produce a hydrocarbon product.

Once separated from the reactor section of the FCC unit, the hydrocarbon product vapor stream is passed to the gas concentration zone comprising a main column, an absorption zone, a stripping zone, and a debutanizer zone. In the main column, the hydrocarbon product vapor stream is separated into a main column overhead stream, naphtha, and cycle oils. The main column overhead stream comprises $C_1$ to $C_{10}$ hydrocarbons, including $C_3$ and $C_5$ olefinic hydrocarbons, water, metal cations (such as sodium), nitrogen compounds such as ammonia and nitrites such as acetonitrile (ACN), and sulfur compounds such as $H_2S$, COS, and mercaptans. Gasoline and gaseous olefin-rich co-products are taken overhead and routed to the gas concentration zone. In the gas concentration zone, the olefin-rich gas is compressed and directed through a series of absorbers, strippers, and fractionation towers to produce the FCC products which include FCC gasoline which is a high octane motor fuel blending component, and light olefinic materials which can be converted to high octane gasoline blending components by alkylation to produce alkylate or by etherification to produce ethers.

According to the present invention, wherein a portion of the high pressure aqueous stream is admixed with fresh water, or refinery condensate, or treated sour water stream, and the admixture is used to wash the intermediate vapor stream, the overall requirement for the fresh wash water to achieve the same impurity removal as scheme A or C of the prior art is significantly reduced. The impurities include compounds selected from the group consisting of hydrogen sulfide, hydrogen cyanide, ammonia, nitrogen compounds, and mixtures thereof. It was determined that by returning a portion of the high pressure aqueous stream to wash the intermediate vapor stream in an amount equal to about 0.1 to about 10 percent of the volume of the FCC feedstock, charged to the FCC unit, permitted a reduction in the overall amount of fresh water. In an alternate operation of the FCC process of the present invention, at least a portion of sour water stream from an FCC gas concentration zone is returned to be admixed with the main column overhead stream of the FCC unit and a portion of the high pressure water stream is admixed with fresh water to reduce the concentration of impurities in the high pressure liquid at significant reduction in the fresh water or condensate requirement. Preferably, a ratio of the portion of the low pressure aqueous stream returned to the main column overhead stream to the portion of the low pressure aqueous stream withdrawn as the sour water stream, ranges from about 0.40 to about 0.60 volume fraction.

Suitable FCC feedstocks include, but are not limited to, straight-run atmospheric gas oils, vacuum gas oils, and certain atmospheric residues. The FCC catalyst can be any FCC catalyst known to those skilled in the art; preferably, it will be a zeolite-containg catalyst.

Once separated from the reactor section of the FCC unit, the hydrocarbon product vapor stream is passed to the gas concentration zone comprising a main column, a cooling and compression zone wherein the water washing takes place, an absorption zone, a stripping zone, and a debutanizer zone. Gasoline and gaseous olefin-rich co-products are taken overhead and routed to the gas concentration zone. In the gas concentration zone, the olefin-rich gas is compressed and cooled in a stage-wise manner before being directed through a series of absorbers, strippers, and fractionation towers to produce an FCC effluent.

DETAILED DESCRIPTION OF THE DRAWINGS

Referring to FIG. 1, an FCC hydrocarbon gas oil feedstock enters an FCC reaction zone and main column zone 100 at line 10. A main column overhead stream exits the FCC section 100 via line 12. The main column overhead stream comprises $C_1$–$C_{10}$ hydrocarbons, including $C_3$ and $C_5$ olefinic hydrocarbons, metal cations (such as sodium), nitrogen compounds such as ammonia and nitriles such as acetonitrile (ACN), and sulfur compounds such as $H_2S$, COS, and mercaptans.

The main column overhead stream is passed to a main column overhead cooler 102 via lines 12 and 12'. The cooled main column overhead stream is passed via lines 14' and 16 to a main column overhead receiver 104, which is maintained at a temperature of about 25° C. (80° F.) to about 60° C. (140° F.) and a low pressure of about 140 kPa (20 psia) to about 350 kPa (50 psia), and more preferably, a pressure range of about 170 kPa to about 210 kPa, permits the separation of the cooled main column overhead stream in line 16 into a low pressure waste water stream 20, a low pressure vapor stream in line 22, and a first hydrocarbon liquid stream 18. The waste water stream in line 20 is withdrawn typically to a sour water stripper (not shown) for removal of impurities and disposal. The first hydrocarbon liquid stream 18 is withdrawn. The low pressure vapor stream in line 22 is passed to a first compression stage 114 to provide an intermediate pressure stream in line 28. The intermediate pressures ranges between about 525 kPa (75 psia) and about 800 kPa (115 psia). The intermediate vapor stream in line 28 is admixed with a fresh wash water stream in line 30 to provide an intermediate pressure admixture in line 30'. The intermediate pressure admixture is passed via line 30' to inner cooler 106 to provide a cooled intermediate stream in line 34. The cooled intermediate stream is passed to flash chamber 108 which separates the cooled intermediate stream in line 34 into an intermediate vapor stream in line 38 and intermediate liquid stream in line 36. The intermediate vapor stream is passed to a second stage of compression 116 to provide a high pressure vapor stream in line 42. The high pressure ranges from about 1155 kPa to about 1575 kPa. The high pressure vapor stream in line 42 is admixed with the high pressure liquid in stream 36, the high pressure liquid having been pumped in a pump which is not shown on the drawing. At this point, the stripper vapor stream, in line 44 and a primary absorber rich oil stream in line 46 are admixed to provide a treating admixture in line 48 which is shown on the drawing as being admixed with the high pressure vapor stream in line 42 to provide a second high pressure admixture in line 49 which is then shown admixed with the high pressure liquid in line 36 to provide a third high pressure admixture in line 50. The high pressure admixture in line 50 is passed to the high pressure cooler 110 and a cooled high pressure condensate is withdrawn in line 52 and passed to high pressure receiver 112. In the high pressure receiver 112, a high pressure vapor stream in line 54 is withdrawn, a high pressure liquid stream in line 56 is withdrawn and a high pressure aqueous stream in line 60 is withdrawn. A high pressure aqueous stream in line 60 is returned via stream 64 to be admixed with the overhead stream in line 12 or recycled via line 62 which is admixed with the cooled overhead stream in line 14'. This scheme represented in FIG. 1 is a conventional scheme as described in option A or C type schemes where the fresh water or refinery condensate is provided at the intermediate pressure level and the sour water is withdrawn from the low pressure receiver 104. The scheme illustrated in FIG. 1 generally has a water injection rate which varies from 5 to 8% of the feed volume of the charge to the FCC reaction zone.

Figure 2:
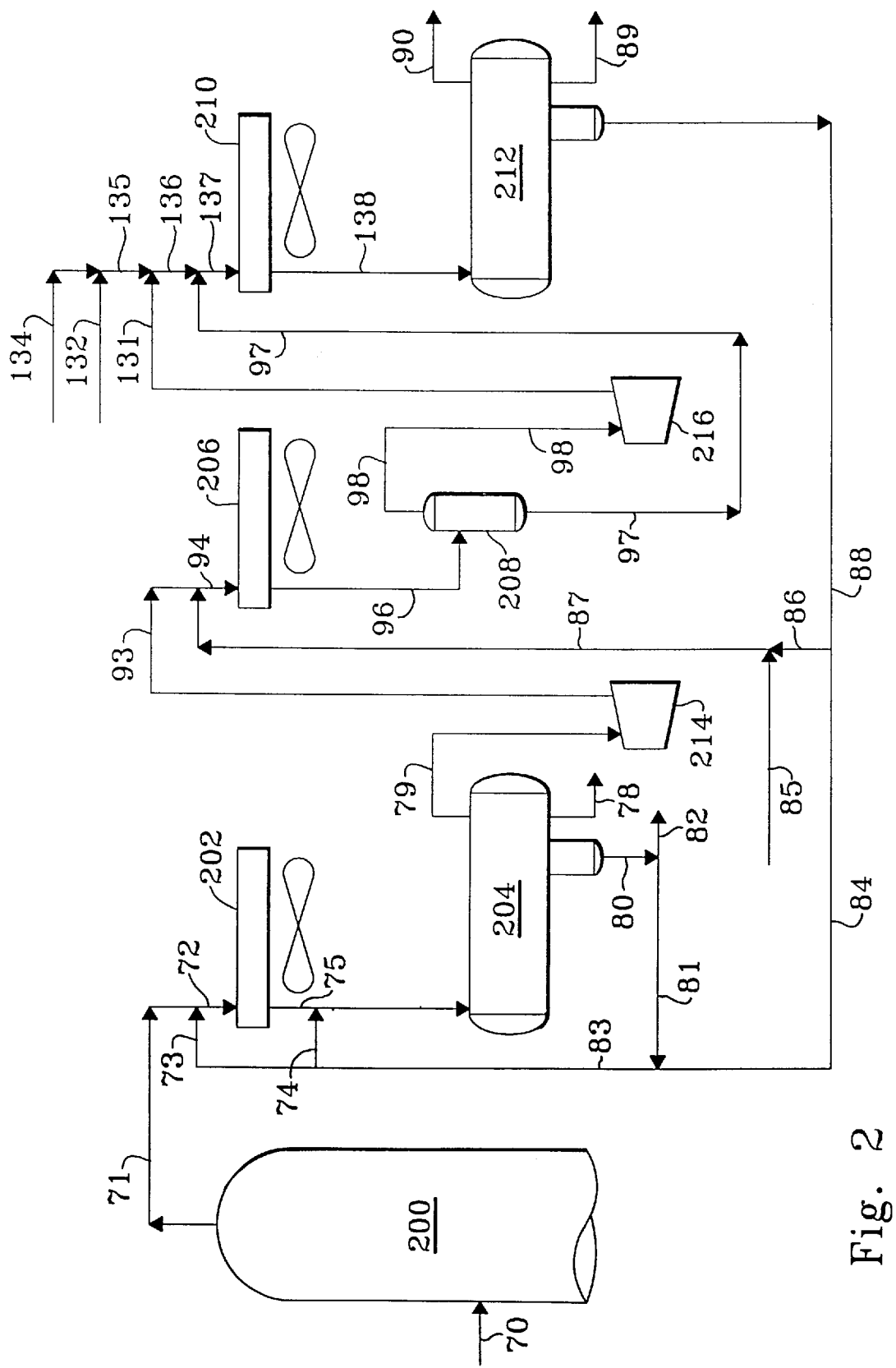
FIG. 2 is a simplified process flow diagram of the present invention wherein a portion of the high pressure water stream is admixed with the fresh water stream.

The present invention is illustrated in FIG. 2. Referring to FIG. 2, an FCC hydrocarbon gas oil feedstock in line 70 enters an FCC reaction zone and main column zone 200. A main column overhead stream is withdrawn from the FCC reaction and main column zone 200 via line 71. The main column overhead stream is passed via lines 71 and 72 to a low pressure cooler 202 to provide a cooled main column overhead stream in line 75. The cooled main column overhead stream in line 75 is conveyed to the main column overhead receiver 204 where the cooled main column overhead stream is separated into a low pressure vapor stream in line 79, a low pressure hydrocarbon liquid stream in line 78, and a low pressure water stream in line 80. A portion of the low pressure water stream is withdrawn in line 82. The low pressure vapor stream is passed to a first compression zone 214 to provide an intermediate pressure vapor stream in line 93. The intermediate pressure vapor stream is passed to the intermediate cooler 206 via lines 93 and 94. The intermediate cooler 206 provides a cooled intermediate stream in line 96 which is passed to an intermediate flash drum 208. In the intermediate flash drum 208, a vapor portion of the intermediate vapor stream is withdrawn via line 98 and passed to a second stage of compression 216 to raise the intermediate vapor stream in line 98 to provide a high pressure vapor stream in line 131. The intermediate liquid stream in line 97 is increased in pressure via a pump which is not shown to produce a high pressure liquid stream in 97. A stripper vapor stream in line 134 and a primary adsorber rich oil stream in line 132 are shown admixed to provide a treating recycle stream in line 135 which is admixed with the high pressure vapor stream in line 131 to provide a first high pressure admixture in line 136. The first high pressure admixture in line 136 is admixed with the intermediate pressure liquid now at the high pressure to provide a second high pressure admixture in line 132. The second high pressure admixture is passed to the high pressure cooler 210 to cool and at least partially condense a second high pressure admixture to provide a cooled high pressure admixture in line 138. The cooled high pressure admixture is passed to a high pressure receiver 212 wherein the cooled high pressure admixture is separated to provide a high pressure vapor stream in line 90, a high pressure liquid stream in line 89, and a high pressure water stream in line 88. A first portion of the high pressure water stream, or first water recycle stream, in line 88 is passed via lines 88 and 86 to a point where it is admixed with a fresh wash water stream in line 85 to produce an intermediate wash water stream in line 87. The intermediate wash water stream is injected into the intermediate vapor stream in line 93. A second portion of the high pressure water stream is passed via line 84, line 83, and line 73 to be injected into the main column overhead stream in line 71 or injected into the cooled main column overhead stream in line 75 via line 74. In an alternate embodiment, a portion of the low pressure water stream in line 80 may be injected into the high pressure water stream in line 84.

The following examples are provided for illustrative purposes and are not intended to limit the scope of the claims that follow. Example I is an illustrative example of a flow scheme which is representative of the prior art, conventional operation wherein the main column overhead from an FCC main fractionator is passed at low pressure to water wash circuit to remove impurities as shown in FIG. 1. Example II is illustrative of the present invention wherein the fresh water wash rate to the water wash circuit is reduced by about 50% while achieving the same degree of impurity removal as the conventional scheme of Example I. The ammonia removal efficiency of the scheme of the present invention is greater than about 95 mol-%. Example III represents a variation on the present invention wherein a portion of the sour water waste stream is returned to be admixed with the overhead stream at the reduced fresh water rate.

EXAMPLES

The following examples were developed from engineering design simulations and selected commercial plant data.

Example I

A conventional fluid catalytic cracking unit, operating as shown in FIG. 1 at a volumetric feed rate of about 187 cubic meters per hour (m³/hr) (28,300 barrels per stream day (BPSD)) produces a main column overhead stream which comprises about 5.6 m³/hr (850 BPSD) water and impurities. Approximately, 9.4 m³/hr (1415 BPSD) of fresh water or a refinery condensate stream is introduced at an intermediate pressure between the first and second compression stages. The overhead stream is cooled, contacted with wash water from the high pressure receiver, and passed to the main column overhead receiver to produce a sour waste water stream in the amount of about 14.9 m³/hr (2255 BPSD).

Example II

A water wash scheme of the present invention, based on FIG. 2 wherein all of the sour water is removed from the main column overhead receiver, was developed. As shown in FIG. 2, a portion of the high pressure water stream is withdrawn from the high pressure receiver and admixed with a reduced amount of refinery condensate, introduced between the first and second compressor stages. Surprisingly, it was discovered that returning a portion of the water stream withdrawn from the high pressure receiver at a point between the first and second compressor stages enabled the amount of refinery condensate to be reduced in half while removing essentially the same amount of impurities. A summary of the results comparing Example I and Example II is presented in Table 1 expressed in the customary units of the volume percentage of the FCC unit feed rate. Table 1 also includes estimates of impurity levels for the prior art operation of Example I and the operation of the present invention as represented by Example II.

TABLE 1

COMPARISION OF FCC WASH WATER RATES
(All Water Rates Shown As a Percentage of FCC Feed Rate)

| WATER BALANCE | EXAMPLE I | EXAMPLE II |
| --- | --- | --- |
| WATER IN OVERHEAD STREAM | 3.0 | 3.0 |
| WATER WITHDRAWN FROM MAIN COLUMN RECEIVER | 8.0 | 5.5 |
| REFINERY CONDENSATE | 5.0 | 2.5 |
| AMMONIA REMOVAL EFFICIENCY % MOL | 96.8 | 95.9 |
| SOUR WATER IMPURITY, WPPM | | |
| AMMONIA | 1752 | 1944 |
| HYDROGEN CHLORIDE | 3262 | 3499 |
| CARBON DIOXIDE | 2276 | 2510 |
| HYDROGEN SULFIDE | 3380 | 1196 |
| HYDROGEN CYANIDE | 39 | 41 |
| PHENOL | 326 | 350 |

EXAMPLE III

A variation on the present invention shown in FIG. 2 evaluated wherein a portion of the low pressure sour waste water is withdrawn from the main column overhead receiver in line 81 and is returned to be admixed with the main column overhead stream 71 via lines 81, 83, and 73. In this alternate operation, the fresh water rate or refinery condensate rate may be reduced with a slight reduction in the impurity removal efficiency as illustrated by the ammonia removal efficiency. The results of the simulation of Example III are shown in Table 2 with rates reported as a percentage of the FCC charge rate.

TABLE 2

| FCC WASH WATER RATES | EXAMPLE III |
| --- | --- |
| WATER IN OVERHEAD STREAM | 3.0 |
| WATER WITHDRAWN FROM MAIN COLUMN RECEIVER | 5.5 |
| REFINERY CONDENSATE | 2.5 |
| AMMONIA REMOVAL EFFICIENCY, % MOL | 94 |

I claim:

1. A process for water washing an overhead stream withdrawn from an FCC main fractionator of an FCC unit processing an FCC feedstock to remove impurities from the overhead stream, said process comprising:
   a) admixing said overhead stream with a first portion of a first water recycle stream at a low pressure ranging from about 140 to about 350 kPa to provide a combined overhead stream;
   b) cooling and at least partially condensing the combined overhead stream to provide a cooled overhead stream and passing the cooled overhead stream to a low pressure separator to provide a low pressure vapor stream, a low pressure liquid stream, and a low pressure aqueous stream;
   c) raising the low pressure vapor stream to an intermediate pressure ranging from about 525 to about 800 kPa to provide an intermediate vapor stream and admixing the intermediate vapor stream with a wash water stream and a second portion of the first water recycle stream to provide an intermediate pressure admixture;
   d) raising the intermediate pressure admixture to a high pressure ranging from about 1155 to about 1575 kPa to provide a high pressure stream and cooling and at least partially condensing the high pressure stream to provide a cooled high pressure stream and passing the cooled high pressure stream to a high pressure separator to provide a high pressure vapor stream, a high pressure liquid stream and a high pressure aqueous stream; and,
   e) recycling at least a portion of the high pressure aqueous stream as the first water recycle stream, and withdrawing a portion of the low pressure aqueous stream as a sour water stream.

2. The process of claim 1 wherein the wash water is selected from the group consisting of fresh water, a refinery condensate, a treated sour water stream, and mixtures thereof.

3. The process of claim 1 wherein the impurities are selected from the group consisting of hydrogen sulfide, hydrogen cyanide, ammonia, nitrogen compounds, and mixtures thereof.

4. The process of claim 1 wherein the overhead stream comprises $C_1$–$C_5$ hydrocarbons, water, and impurities.

5. The process of claim 1 wherein a volumetric percentage of the first water recycle stream admixed with the intermediate vapor stream comprises between about 0.1 and 10 percent of the FCC feedstock.

6. The process of claim 1 further comprising admixing a portion of the low pressure aqueous stream with the overhead stream.

7. The process of claim 6 wherein a ratio of the portion of the low pressure aqueous stream admixed with the overhead stream to the portion of the low pressure aqueous stream withdrawn as the sour water stream ranges from about 0.40 to about 0.60 volume fraction.

* * * * *